(12) United States Patent  
Legako et al.

(10) Patent No.: US 7,441,158 B1  
(45) Date of Patent: Oct. 21, 2008

(54) EMBEDDED HARDWARE DEBUGGING TOOL AND ASSOCIATED METHOD

(75) Inventors: Michael R. Legako, Rowlett, TX (US); Darren R. Berube, McKinney, TX (US); Jonathan R. Annillo, Rowlett, TX (US)

(73) Assignee: L-3 Communications Integrated Systems, L.P., Greenville, TX (US)

( * ) Notice: Subject to any disclaimer, the term of this patent is extended or adjusted under 35 U.S.C. 154(b) by 490 days.

(21) Appl. No.: 11/032,517

(22) Filed: Jan. 10, 2005

(51) Int. Cl.  
*G06F 11/00* (2006.01)

(52) U.S. Cl. .......................................... 714/46; 714/57

(58) Field of Classification Search .................. 714/46, 714/57  
See application file for complete search history.

(56) References Cited

U.S. PATENT DOCUMENTS

| | | | | |
|---|---|---|---|---|
| 5,680,584 | A | 10/1997 | Herdeg et al. ............... | 395/500 |
| 5,951,696 | A | 9/1999 | Naaseh et al. ................. | 714/34 |
| 6,094,715 | A * | 7/2000 | Wilkinson et al. ............ | 712/20 |
| 6,132,109 | A | 10/2000 | Gregory et al. ............. | 395/704 |
| 6,189,140 | B1 * | 2/2001 | Madduri ..................... | 717/128 |
| 6,330,690 | B1 * | 12/2001 | Nouri et al. .................... | 714/23 |
| 6,480,801 | B2 * | 11/2002 | Chew .......................... | 702/122 |
| 6,539,497 | B2 * | 3/2003 | Swoboda et al. .............. | 714/30 |
| 6,546,526 | B2 | 4/2003 | Lai et al. ....................... | 716/4 |
| 6,581,191 | B1 | 6/2003 | Schubert et al. ................ | 716/4 |
| 6,658,600 | B1 * | 12/2003 | Hogdal et al. ................. | 714/33 |
| 6,697,962 | B1 * | 2/2004 | McCrory et al. .............. | 714/27 |
| 6,901,589 | B2 | 5/2005 | White ......................... | 717/166 |
| 6,993,772 | B2 | 1/2006 | Pike et al. .................... | 719/321 |
| 7,024,660 | B2 | 4/2006 | Andrade et al. ............. | 717/124 |
| 7,065,481 | B2 | 6/2006 | Schubert et al. .............. | 703/14 |
| 7,171,653 | B2 | 1/2007 | Albrecht ..................... | 717/124 |
| 2005/0216791 | A1 * | 9/2005 | Liu et al. ...................... | 714/25 |
| 2006/0059387 | A1 * | 3/2006 | Swoboda et al. ............. | 714/30 |
| 2006/0069960 | A1 * | 3/2006 | Short et al. ................... | 714/38 |
| 2006/0090093 | A1 * | 4/2006 | Goedde et al. ................. | 714/4 |
| 2006/0129375 | A1 * | 6/2006 | Lenz et al. .................... | 703/25 |
| 2006/0143493 | A1 * | 6/2006 | Meis et al. ..................... | 714/4 |
| 2007/0101193 | A1 * | 5/2007 | Johnson et al. ............... | 714/25 |
| 2007/0174715 | A1 * | 7/2007 | Kilian ......................... | 714/38 |

OTHER PUBLICATIONS

Products Corporate Info Contact, VMETRO, "*Bus Analyzers from VMETRO,*" Copyright VMETRO 2005.  
General Micro Systems, "*Atlas-V V2P4 Dual VME Pentium III SBC with Triple PMC,*" 901-060 Rev. 01.1, Sep. 14, 2001.

* cited by examiner

*Primary Examiner*—Bryce P Bonzo  
(74) *Attorney, Agent, or Firm*—O'Keefe, Egan, Peterman & Enders, LLP (57) ABSTRACT

A multi-platform script language interpreter designed for hardware debug is disclosed along with related methods. In part, the invention is configured to act as an embedded hardware debugging software tool for embedded hardware operating on platforms with internal hardware buses, such as platforms with VME buses. The present invention is applicable to a wide variety of buses and can be configured for use with desired buses through the addition of appropriate libraries.

17 Claims, 4 Drawing Sheets

EMBEDDED HARDWARE DEBUGGING TOOL AND ASSOCIATED METHOD

NOTICE OF COPYRIGHT

A portion of this patent document contains material, which is subject to a copyright protection. The copyright owner has no objection to the reproduction by anyone of the patent disclosure, as it appears in the Patent and Trademark Office patent files or records, but otherwise reserves all copyright rights whatsoever.

TECHNICAL FIELD OF THE INVENTION

This invention relates to the debugging and testing hardware devices embedded into computing platforms, such as platforms having VME busses.

BACKGROUND

Many systems that are designed for military and commercial use include hardware devices that are embedded as part of a computing platform. In development and production of such embedded hardware devices, the hardware utilized by these devices must be tested. And any internal software within the devices must be tested and debugged. The software testing and debug process is difficult due to the lack of tools to test embedded hardware.

Figure 2:
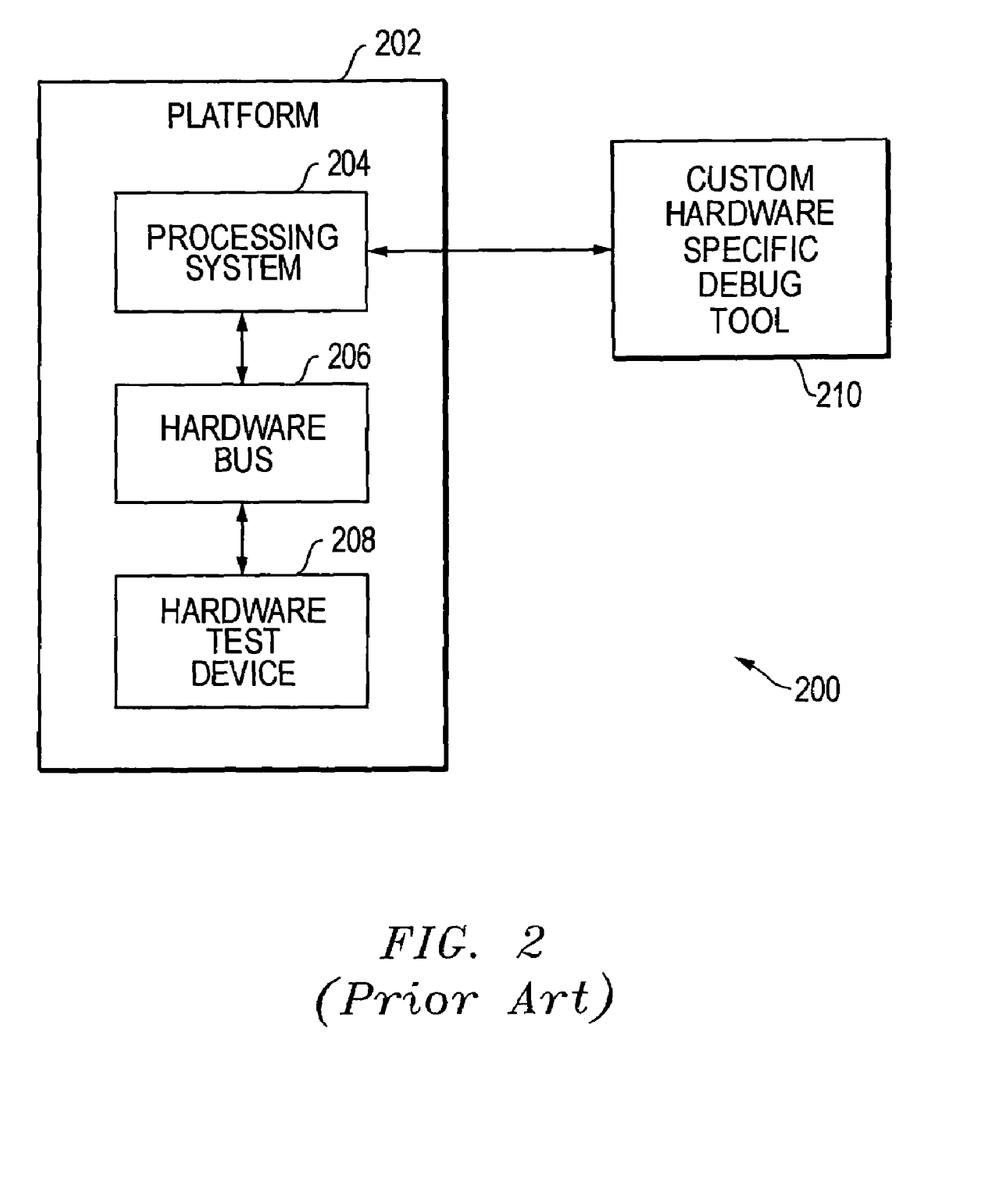
FIG. 2 (prior art) is a block diagram for prior debug solutions that utilize custom-designed, hardware-specific debug tools.

FIG. 2 (prior art) provides a block diagram for an example environment 200 of prior solutions for testing embedded hardware devices. The platform 202 represents a computing platform within which an embedded hardware device will operate. The hardware bus 206 represents the bus through which the hardware device will communicate with the platform processing system 204. The hardware test device 208 represents the embedded hardware device being tested. One example of a platform 202 is a computing platform that includes a central processing unit (CPU), program storage (e.g., program storage provided by memory integrated circuits or hard disk storage) connected to a motherboard, and a hardware bus 206, such as a VME bus. Currently, VME (VersaModule Eurocard) buses are widely used in industrial, commercial and military applications. A wide variety of hardware devices have been and can be designed for use with VME enabled CPUs and computing platforms. The hardware devices, for example, can take the form of processing cards that attach to VME slots within the VME computing platforms.

As stated above, one significant problem in developing embedded hardware devices for computing platforms, such as VME computing platforms, is debugging the hardware device in operation within the computing system. Prior attempts to solve this testing problem have primarily focused on developing custom, hardware-specific debug tools that are designed specifically for the platform, the hardware bus and the embedded hardware device involved in the project. Looking back to FIG. 2 (prior art), block 210 represents such a prior debug tool. The custom, hardware-specific debug tool 210 is developed along with the embedded hardware test device 208, and the custom, hardware-specific debug tool 210 is used to communicate with the processing system 204 to test and debug the embedded hardware test device 208. The problem with this approach is the time and resources required to develop and customize a new debug tool for every embedded hardware device developed.

There are a variety of existing tools that can be utilized by developers; however, they are designed for particular platforms and do not solve this hardware debug test problem. Mathematical tool vendors provide programs for mathematical analyses, such as MATLAB offered by MathWorks, but such programs do not directly address embedded hardware debug. Some Single Board Computer (SBC) vendors, like General Micro-Systems (GMS), provide simple bus access programs, like VMExpress, but do not provide a tool directed to embedded hardware debug. Bus analysis companies, like Vmetro, provide bus analyzer hardware and software to observe bus traffic but no means to perform complex embedded hardware bus based programming is provided. Operating system vendors, such as WindRiver, supply debugging mechanisms limited to their specific operating systems. Instrumentation vendors, like National Instruments, provides tools to control instruments but again do not provide tools to solve embedded hardware debug. In short, the tools available do not provide a multi-platform tool specifically directed to embedded hardware device debug operations.

SUMMARY OF THE INVENTION

The present invention provides a multi-platform script language interpreter designed for hardware debug. In part, the invention is configured to act as an embedded hardware debugging software tool for embedded hardware operating on platforms with internal hardware buses, such as VME platforms. The present invention is applicable to a wide variety of buses and can be configured for use with desired buses through the addition of appropriate libraries.

In one embodiment, the present invention is an embedded hardware debug system including a processor, I/O circuitry coupled to the processor and configured to provide an external port, program storage coupled to the processor, an operating system installed in the program storage, a hardware bus coupled to the processor, and an embedded hardware device coupled to the hardware bus. In addition, the system includes a first software module installed in the program storage and configured to facilitate test and debug communications between the processor and the embedded hardware device through the hardware bus, where the first software module being dependent upon the operating system and the hardware bus. And the system includes a second software module configured to respond to inquiries from the first software module during testing and debugging operations, where the second software module being independent of the operating system and the hardware bus. The first and second software modules are also configured to load graphical user interfaces (GUIs) and libraries at run-time without requiring re-compiling or re-linking. As described below, other features and variations can be implemented, if desired, and related methods can be utilized, as well.

In another embodiment, the present invention is a multi-platform embedded hardware debug installer system including an installation processing system configured to communicate with a plurality of different test systems through an external communication port on the test systems, where each test system comprising a processor, program storage, an internal hardware bus, and an embedded hardware device; and an install software module configured to operate on the installation system, where the install software module is further configured to install one or more hardware debug software modules on the test system depending upon an operating system and a type of hardware bus for the test system. The one or more hardware debug software modules are also configured to load graphical user interfaces (GUIs) and libraries at run-time without requiring re-compiling or re-linking. As described below, other features and variations can be implemented, if desired, and related methods can be utilized, as well.

In a further embodiment, the present invention is a method for debugging embedded hardware devices including providing a hardware platform including a processor, I/O circuitry coupled to the processor and configured to provide an external port, program storage coupled to the processor, a hardware bus coupled to the processor, and an embedded hardware device coupled to the hardware bus; depending upon an operating system and a type of hardware bus for the test system, installing a first software module in the program storage configured to facilitate test and debug communications between the processor and the embedded hardware device through the hardware bus; independent from an operating system and a type of hardware bus for the test system, installing a second software module configured to respond to inquiries from the first software module during testing and debugging operations; and operating the first and second software modules to load graphical user interfaces (GUIs) and libraries at run-time without requiring re-compiling or re-linking. As described below, other features and variations can be implemented, if desired, and related systems can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides a multi-platform script language interpreter designed for hardware debug. In part, the invention is configured to act as an embedded hardware debugging software tool for embedded hardware operating on platforms with internal hardware buses, such as platforms with VME buses. The present invention is applicable to a wide variety of buses and can be configured for use with desired buses through the addition of appropriate libraries.

Figure 1:
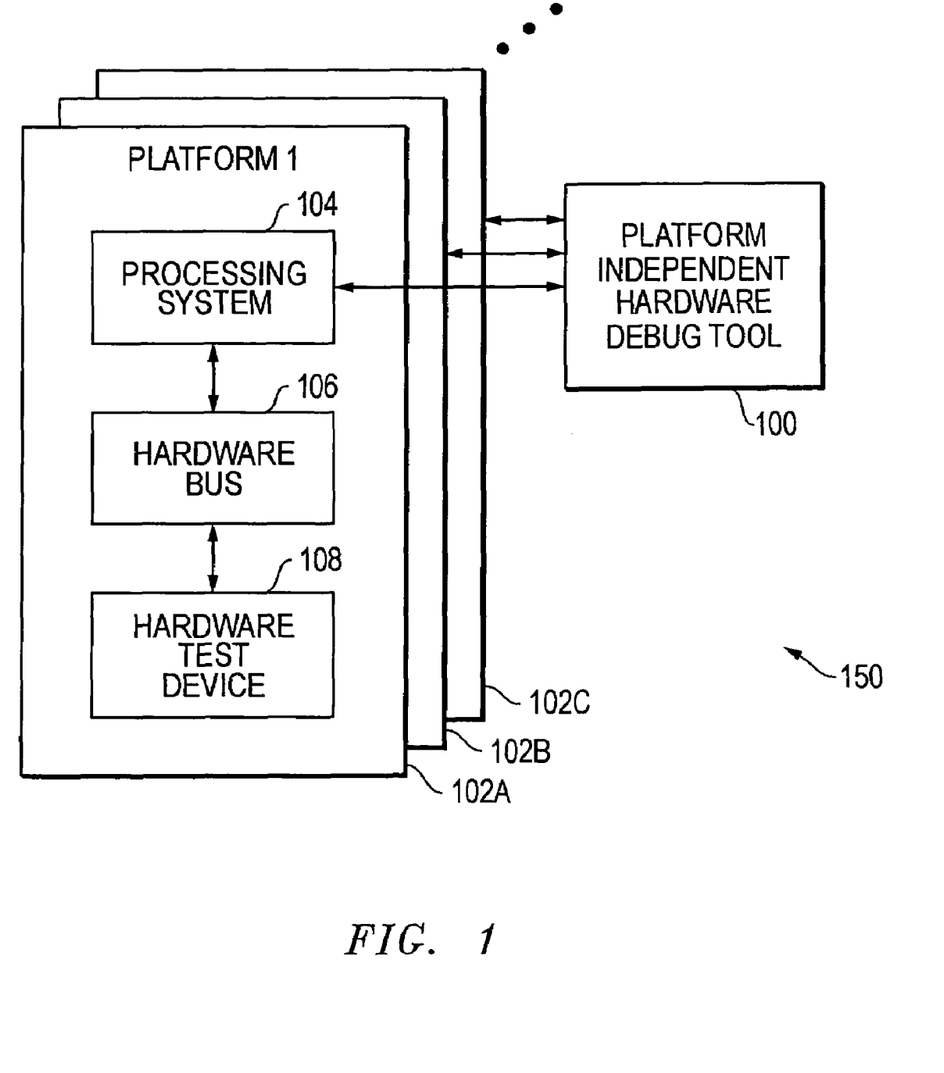
FIG. 1 is a block diagram of a platform independent hardware debug tool that can be used with a variety of platforms to test embedded hardware devices.

FIG. 1 is a block diagram for an example environment 150 of a platform independent hardware debug tool 100 that can be used with a variety of platforms 102A, 102B, 102C . . . to test embedded hardware devices 108. Each platform 102A, 102B, 102C . . . can be implemented utilizing any desired processing system and associated bus protocols. For example, platform (Platform 1) 102A includes a processing system 104, a hardware bus 106 and a hardware test device 108. The processing system 104 can be implemented using CPUs, micro-controllers, logic circuitry, programmable logic arrays, or any other desired control circuitry. And the process system 104 can include peripheral integrated circuits and non-integrated circuits, such as input/output (I/O) circuitry, memory circuits, memory controllers, disk storage, disk controllers, display drivers, or any other desired peripheral circuitry. The hardware bus 106 represents a communication bus or connections utilized by the processing circuitry 104 to communicate with embedded hardware devices. An example hardware bus 106 is the VME bus, which is utilized in many commercial and military systems. The hardware test device 108 is the embedded hardware device being tested for operation within the platform (Platform 1) 102A. The hardware test device 108 communicates with the processing system 104 through the hardware bus 106 and can be any desired type of embedded device, including data acquisition devices, such as antennas. It is noted that in the discussion below, the embedded hardware devices, such as VME embedded hardware devices, are typically electronic devices, modules, or cards based in some form upon the specification for the embedded hardware bus.

The platform independent hardware debug tool 100 is used to test and debug the hardware test device 108 in operation within the platform (Platform 1) 102A. Unlike prior solutions, the debug tool 100 of the present invention can communicate to multiple different platforms as represented by the connections to platforms 102A, 102B, 102C . . . and, therefore, is not customized and developed for use with a single platform. More particularly, the hardware debug tool 100 provides a multi-platform, multi-operating system algebraic matrix based scripting language and IDE (integrated development environment) for embedded hardware debug that can be used locally or remotely. Modular design of programs and libraries is utilized. No fixed operators, functions or variables are used, and unbounded growth is allowed. The user enables only those things that are required, thereby increasing speed and reducing failure modes. Zero-based and/or one-based indexing of vectors and matrices is provided, and the type of indexing utilized is selectable during script execution. Matrix modulo indexing or bounding of indices is provided and is also selectable during script execution. A plurality of number types are supported. And approximately 40 numeric strong operators provide a rich operator set with 8 variable types and 0, 1 or 2 dimensional objects. Type promotion rules handle the combination of different types by operators, and casting allows type demotion. In addition, the multi-platform, multi-operating system client-server architecture utilizes ANSI 'C' server for easy porting.

Figure 3A:
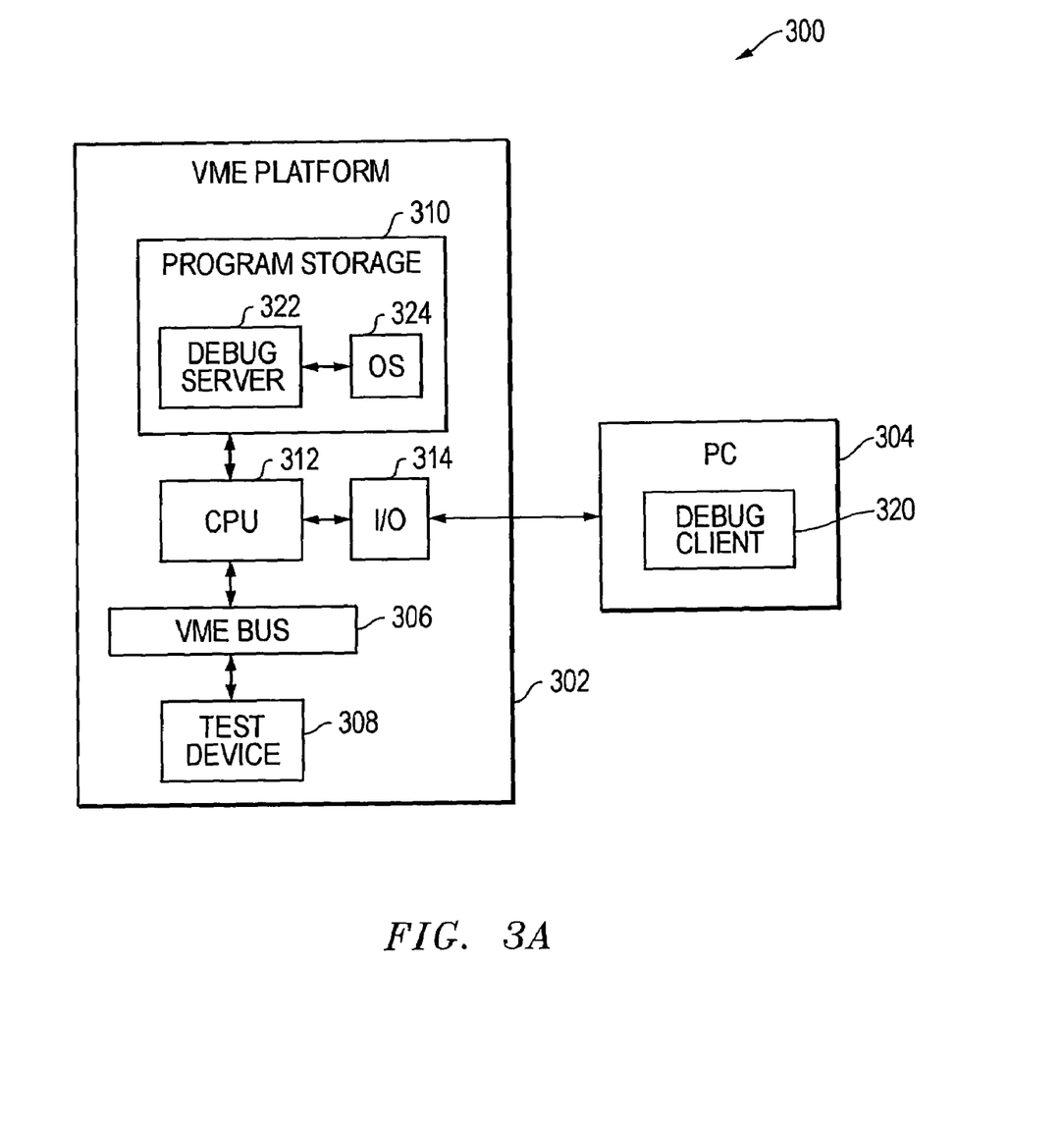
FIG. 3A is a block diagram for a client-server embodiment of the present invention using a VME platform having a VME bus and an embedded VME hardware device to test and debug.

FIG. 3A is a block diagram for a client-server embodiment 300 of the present invention for a VME platform 302 having a VME bus 306 and an embedded VME hardware device 308 to test and debug. The VME platform 302 includes a CPU 312, I/O circuitry 314, program storage 310 and VME bus 306. The embedded VME test device 308 communicates with the CPU 312 through the VME bus 306. The program storage 310 includes, in part, operating system software 324 and debug server software 322. The debug server software 322 is the server-side of the platform independent hardware debug tool of the present invention. The client-side software 320 of the platform independent hardware debug tool can run remotely, for example, on an external processing system, such as personal computer (PC) 304. The PC 304 can communicate with the VME platform through a communication port that is part of the I/O circuitry 314. This communication port can be, for example, an Ethernet port.

Figure 3B:
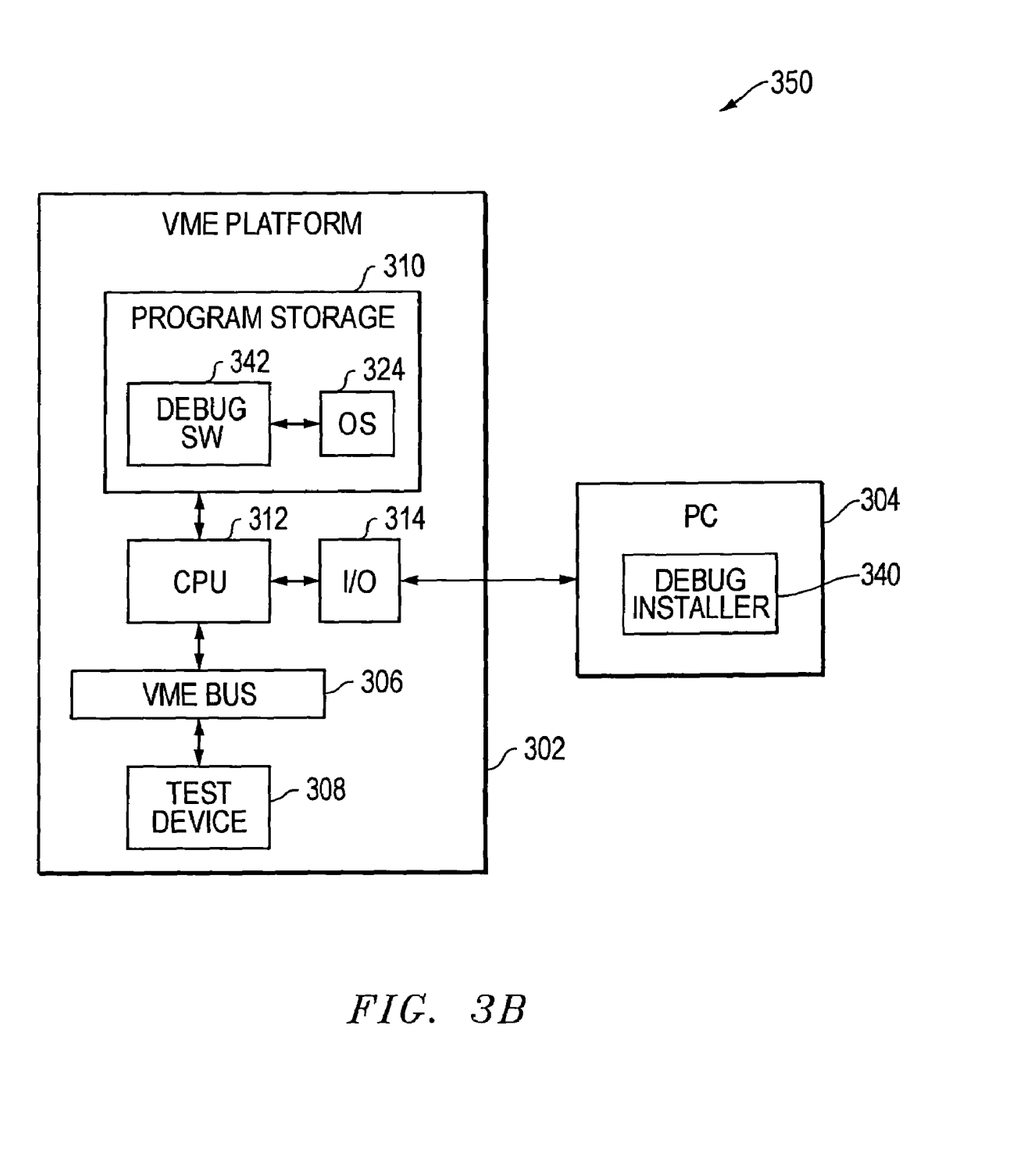
FIG. 3B is a block diagram for an alternative local-only embodiment of the present invention for a VME platform having a VME buses and an embedded VME hardware device to test and debug.

FIG. 3B is a block diagram for an alternative local-only embodiment 350 of the present invention for a platform 302 having VME buses and an embedded VME hardware device 308 to test and debug. Compared to the embodiment 300 of FIG. 3A, the embodiment 350 has a local-only version of the platform independent hardware debug tool, as represented by debug software (SW) block 342. This debug software (SW) 342 can be loaded into the program storage 310 by an external processing system, such as PC 304. The debug installer 340 operates to install the debug software (SW) 342 by communicating through a communication port that is part of the I/O circuitry 314. As indicated above, the communication port may be, for example, an Ethernet port.

Different processors or CPUs within different platforms often have Ethernet communication ports. As such, Ethernet can be used as a common interface for a variety of different platforms. The debug tool of the present invention utilizes this common interface to communicate across a plurality of platforms. By utilizing this common communication interface, the debug tool of the present invention can overcome problems matching equivalent functions among disparate operating systems. In the client-server embodiment 300, the debug server software 322 can communicate externally with the debug client 320 to obtain functional information. In this way, software functionality can be implemented in the debug client 320 and kept standard. In the local-only embodiment 350, a robust operating system (OS) 324 can allow for standard functions to be utilized. In this way, the debug tool of the present invention can be utilized across a plurality of disparate platforms using a variety of different operating systems.

In operation, the embedded hardware debug tool of the present invention can provide a number of advantages through its unique features. Some of these features are set forth below:

Program:
No fixed set of GUI's. Each library is loaded at run time. New or modified GUI's can be incorporated without the need to re-compile or re-link—in other words at run-time.

Scripting Language Integrated Development Environment (IDE):
No fixed set of libraries. Script language IDE loads libraries when the IDE GUI is loaded. New or modified libraries can be incorporated without the need to re-compile or re-link—in other words at run-time.
Control Flow Toolbar Buttons will run a script once, or repeat a script until the user aborts it (via a toolbar button for that purpose).

Scripting Language Interpreter:
No fixed set of operators, functions, or constants. User selects only what is required from independent libraries—increases interpreter execution speed, decreases interpreter failure modes, and permits non-simultaneous re-definition of conflicting operators, functions, and constants.

Libraries Designed for Embedded Hardware Debug:
General note for each library:
Two different libraries are actually coded for each named library: a library that actually performs the functions of the library (which depending on the complexity of the function can be large), and secondly a *_Script library that adds the functions of the first library to the scripting language.

The API_MatrixS Library:
Supports multiple built in types including: (unsigned integers, integers, floats, doubles, strings, integer complex, double complex, a container type, and custom types)
Supports more than 40 operators including: assignment, in-place assignment, arithmetic, logical, relational, parenthesis, casting. Various operators are prioritized with either EBE (element-by-element) or DOT (multiply accumulate) effect, and either left or right association. String operators add concatenation, and parsing by delimiters. Operator behavior is type sensitive: for example A+B for numerical types is EBE addition; while for the string type is EBE concatenation.
Supports a common algebraic syntax (that users will find familiar).
Scalar, vector, and matrix arithmetic
Zero or one based indexing is specified by a script statement; so script indexing can adapt to different algorithms (saving programming time). The indexing method can change during execution.
Modulo bounding, or error bounding of variable indices. Bounding method is selectable and applied automatically for operators. For example A[5] for zero indexed vector of 3 elements will load element 2 for modulo bounding, but generate an error for error bounding. Two dimensional modulo bounding simply replicates full or partial copies of the original matrix repeatedly as often as necessary. Modulo bounding is the natural implementation of a FIFO for vectors made intrinsic to a language, while modulo bounding for matrices, makes all matrices block circulant.
Automatic type promotion while type demotion is performed using casting operators. For example, 5+"2.3"=7 (an integer plus a number valued string yields an integer).
Hardware vector tests to detect shorted bits, stuck at bits, and a function to split vectors of big fields into field components.
Fourier transforms, polynomial operations, homogeneous transformations, and content addressing functions.
Supports matrix annotation; the attachment of various ancillary data to a variable; such as its name, filename, row/column headers, index offset, and index slope. (Most of this information is useful for plotting, or loading/saving variables).

API_VME Library:
VME Interface library provides a generic set of functions for supported board vendor VME BSP's.

API_GPIB Library:
Supports several common instruments (IF Generators, Pulse Generator, Logic Analyzer/DSO, Spectrum Analyzer)
Supports any GPIB based instrument with general string based GPIB commands.

API_ControlFlow Library:
Control Flow statements permit looping, and conditional execution.

API_Math Library:
Math Library offers mathematical functions of many types: power, norms, trigonometric, hyperbolic, statistical, rounding, and modern algebra.

API_FPDP Library:
FPDP library offers I/O via FPDP (a high speed 32 bit parallel protocol that can achieve more than 100 MB/s).

API_Time Library:
Time library offers functions to obtain the current date and time, and conversion functions to work with dates and times numerically.

API_CMesh Library:
The CMesh Library offers Graphic column-wise X-Y-Z-C plotting of matrix data sets. Two-dimensional and three-dimensional plots feature eleven projections and nine transformations. The transformations can be animated or dragged (with the mouse). Any column of the matrix to be plotted can be positioned on any axis; the row index of the matrix may also be used as an axis. Matrices may have any number of columns (not just four or less).

An example specification for an embedded hardware debug tool according to the present invention has been included as an APPENDIX in the following pages. This example specification further describes example feature implementation for the embodiments above. It is also noted that the debug specification below is subject to the notice of copyright at the beginning of this specification.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An embedded hardware debug system, comprising:
    a processor;
    I/O circuitry coupled to the processor and configured to provide an external port;
    program storage coupled to the processor;
    an operating system installed in the program storage;
    a hardware bus coupled to the processor;
    an embedded hardware device coupled to the hardware bus;
    a first software module installed in the program storage and configured to facilitate test and debug communications between the processor and the embedded hardware device through the hardware bus, the first software module being dependent upon the operating system and the hardware bus and having a script language interpreter configured to execute scripts to test the embedded hardware device; and
    a second software module configured to respond to inquiries from the first software module during testing and debugging operations, the second software module being independent of the operating system and the hardware bus;
    wherein the first software module is configured to load graphical user interfaces (GUIs) and libraries at run-time without requiring re-compiling or re-linking;
    wherein the loaded GUIs and libraries are user-selected such that no fixed GUIs or libraries are utilized by first software module; and
    wherein only user-selected functions, operators and constants from loaded libraries are used by the script language interpreter such that no fixed functions, operators and constants are utilized.

2. The embedded hardware debug system of claim 1, wherein the second software module is installed on a remote processing system coupled to communicate with the processor through the external port.

3. The embedded hardware debug system of claim 1, wherein the first and second software modules are both combined and installed in the program storage.

4. The embedded hardware debug system of claim 1, wherein the embedded hardware bus is a VME bus.

5. The embedded hardware debug system of claim 1, wherein the embedded hardware device comprises a card.

6. The embedded hardware debug system of claim 5, wherein the embedded hardware card is configured to connect to a socket coupled to the embedded hardware bus.

7. The embedded hardware debug system of claim 6, wherein the embedded hardware bus is a VME bus.

8. The embedded hardware debug system of claim 1, wherein the script language interpreter within the first software module is further configured to support zero-based matrix indexing and one-based matrix indexing.

9. The embedded hardware debug system of claim 1, wherein the script language interpreter within the first software module is further configured to provide automatic modulo range mapping of matrix indices.

10. The embedded hardware debug system of claim 1, wherein the first software module is further configured to provide selectable optimization of scripts such that a script is automatically analyzed to remove unused operator, function and constant elements from use by the script language interpreter.

11. A method for debugging embedded hardware devices, comprising:
    providing a hardware platform including a processor, I/O circuitry coupled to the processor and configured to provide an external port, program storage coupled to the processor, a hardware bus coupled to the processor, and an embedded hardware device coupled to the hardware bus;
    depending upon an operating system and a type of hardware bus for the test system, installing a first software module in the program storage configured to facilitate test and debug communications between the processor and the embedded hardware device through the hardware bus, the first software module having a script language interpreter configured to execute scripts to test the embedded hardware device;
    installing a second software module configured to respond to inquiries from the first software module during testing and debugging operations; and
    operating the first software modules to load graphical user interfaces (GUIs) and libraries at run-time without requiring re-compiling or re-linking, wherein the loaded GUIs and libraries are user-selected such that no fixed GUIs or libraries are utilized by the first software module; and
    operating the script language interpreter within the first software module to execute scripts to test the embedded hardware device, wherein only user-selected functions, operators and constants from loaded libraries are used by the script language interpreter such that no fixed functions, operators and constants are utilized.

12. The method of claim 11, wherein the second software module is installed on a remote processing system coupled to communicate with the processor through the external port.

13. The method of claim 11, wherein the first and second software modules are both installed in the program storage.

14. The method of claim 11, wherein the embedded hardware bus is a VME bus.

15. The method of claim 11, wherein the script language interpreter within the first software module is further configured to support zero-based matrix indexing and one-based matrix indexing.

16. The method of claim 11, further comprising operating the script language interpreter within the first software module to have automatic modulo range mapping of matrix indices.

17. The method of claim 11, further comprising operating the first software module to provide selectable optimization of scripts including automatically analyzing a script to remove unused operator, function and constant elements from use by the script language interpreter.

* * * * *

UNITED STATES PATENT AND TRADEMARK OFFICE
CERTIFICATE OF CORRECTION

PATENT NO. : 7,441,158 B1  Page 1 of 1
APPLICATION NO. : 11/032517
DATED : October 21, 2008
INVENTOR(S) : Legako et al.

It is certified that error appears in the above-identified patent and that said Letters Patent is hereby corrected as shown below:

In claim 3, column 8, lines 3-4, delete "com-bined and".

Signed and Sealed this

Sixteenth Day of December, 2008

JON W. DUDAS
*Director of the United States Patent and Trademark Office*